United States Patent
Barnett et al.

(10) Patent No.: US 7,489,836 B2
(45) Date of Patent: Feb. 10, 2009

(54) OPTICAL INTERCONNECT SYSTEM FOR HIGH SPEED MICROPROCESSOR INPUT/OUTPUT (IO)

(75) Inventors: Brandon C. Barnett, Beaverton, OR (US); Bruce A. Block, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1266 days.

(21) Appl. No.: 10/392,437

(22) Filed: Mar. 17, 2003

(65) Prior Publication Data

US 2004/0184701 A1  Sep. 23, 2004

(51) Int. Cl.
G02B 6/12 (2006.01)
G02B 6/26 (2006.01)
G02B 6/42 (2006.01)
G02F 1/295 (2006.01)

(52) U.S. Cl. ............ 385/14; 385/4; 385/8; 385/9; 385/15; 385/31; 385/39; 385/50

(58) Field of Classification Search ........... 385/14, 385/15, 31–38, 40–42, 48–50, 1, 4
See application file for complete search history.

(56) References Cited

U.S. PATENT DOCUMENTS

| | | | | |
|---|---|---|---|---|
| 4,504,921 A | * | 3/1985 | Nasuta et al. ............ 359/259 |
| 4,729,111 A | * | 3/1988 | Arrathoon et al. ............ 708/191 |
| 4,775,971 A | * | 10/1988 | Bergmann ................. 398/168 |
| 4,844,571 A | * | 7/1989 | Stanley ...................... 385/45 |
| 4,866,698 A | * | 9/1989 | Huggins et al. .............. 398/43 |
| 4,932,737 A | * | 6/1990 | Yoon et al. ..................... 385/3 |
| 5,010,346 A | * | 4/1991 | Hamilton et al. ............ 341/137 |
| 5,287,212 A | * | 2/1994 | Cox et al. .................... 398/183 |
| 5,347,601 A | * | 9/1994 | Ade et al. ...................... 385/3 |
| 5,408,492 A | * | 4/1995 | Vossler et al. ................ 372/94 |
| 6,222,951 B1 | * | 4/2001 | Huang ......................... 385/14 |
| 6,343,171 B1 | * | 1/2002 | Yoshimura et al. ........... 385/50 |
| 6,421,483 B1 | * | 7/2002 | Hajjar ......................... 385/48 |
| 6,661,825 B2 | * | 12/2003 | Evans et al. .................. 372/50 |
| 2002/0048289 A1 | * | 4/2002 | Atanackovic et al. ......... 372/20 |
| 2002/0071623 A1 | * | 6/2002 | Shekel et al. ................... 385/8 |
| 2003/0031399 A1 | * | 2/2003 | Lim et al. ..................... 385/14 |
| 2003/0128922 A1 | * | 7/2003 | Kolodziejski et al. ......... 385/27 |
| 2004/0067006 A1 | * | 4/2004 | Welch et al. .................. 385/14 |

* cited by examiner

Primary Examiner—Frank G Font
Assistant Examiner—Ryan Lepisto
(74) Attorney, Agent, or Firm—Fish & Richardson P.C.

(57) ABSTRACT

A microchip includes optical layers with integrated waveguides and modulators. A continuous wave light beam coupled to incoming waveguide(s) is modulated and transmitted off-chip by outgoing waveguides coupled to optical interconnects.

20 Claims, 8 Drawing Sheets

OPTICAL INTERCONNECT SYSTEM FOR HIGH SPEED MICROPROCESSOR INPUT/OUTPUT (IO)

BACKGROUND

Microprocessors may use electrical interconnects to communicate with off-chip devices. The interconnects may be in the form of copper strip lines or micro strips. The bandwidth supported by such electrical interconnects may be limited due to because signal attenuation, which may increase with increasing frequency and distance. This limitation on bandwidth may cause a signal bottleneck at the interconnect.

Optical interconnects may be used as an alternative to electrical interconnects. Optical interconnects use photons instead of electrons to move signals. Optical interconnects may offer high bandwidth over relatively large distances while reducing the signal attenuation, electromagnetic interference (EMI), and crosstalk associated with electrical interconnects.

DETAILED DESCRIPTION

Figure 1:
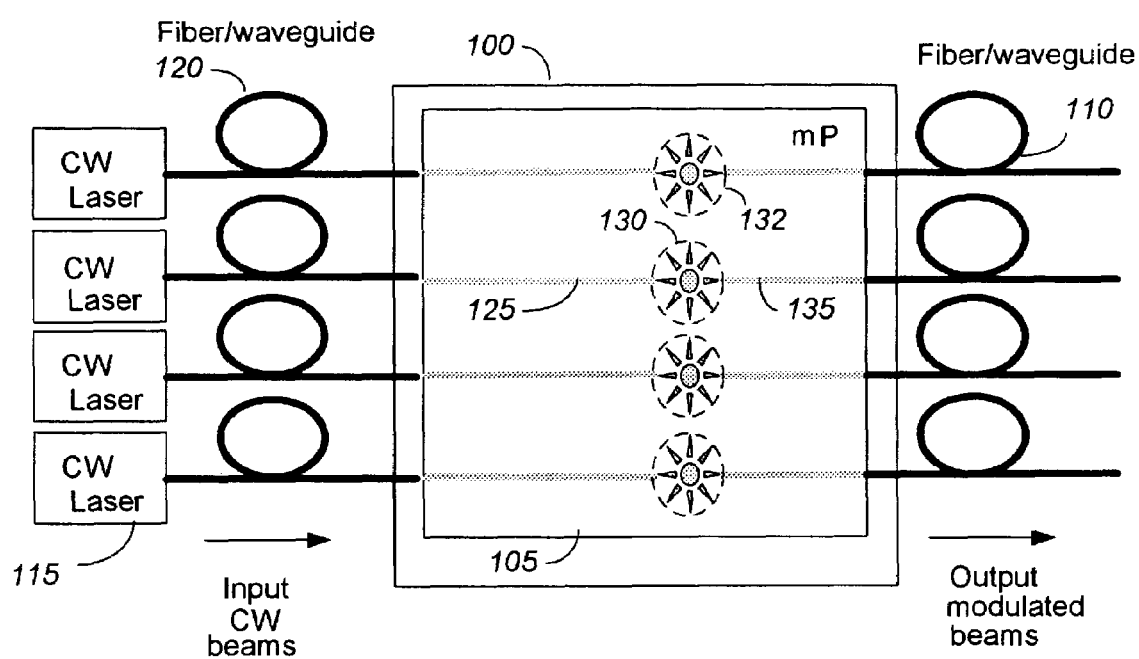
FIG. 1 is a block diagram of a system including a microprocessor with multiple optical interconnects.

FIG. 1 shows a system including a microchip 100 with a microprocessor 105 having optical interconnects 110 for off-chip communication. Continuous-wave (CW) lasers 115 residing off-chip, e.g., on a circuit board or chip package, may supply optical beams to the microprocessor 105. The lasers may be coupled to the microprocessor by optical fibers 120. CW light from the lasers may be injected into the chip 100 by aligning the fibers 120 to incoming waveguides 125 integrated in the chip.

CW light in the integrated waveguides may be coupled through modulators 130 integrated in the chip. Driver circuits 132 in the microprocessor 105 may drive the integrated modulators to modulate the CW light from the lasers for off-chip signaling. The modulated light may be directed off-chip via outgoing integrated waveguides 135 coupled to optical fibers 110.

Figure 2:
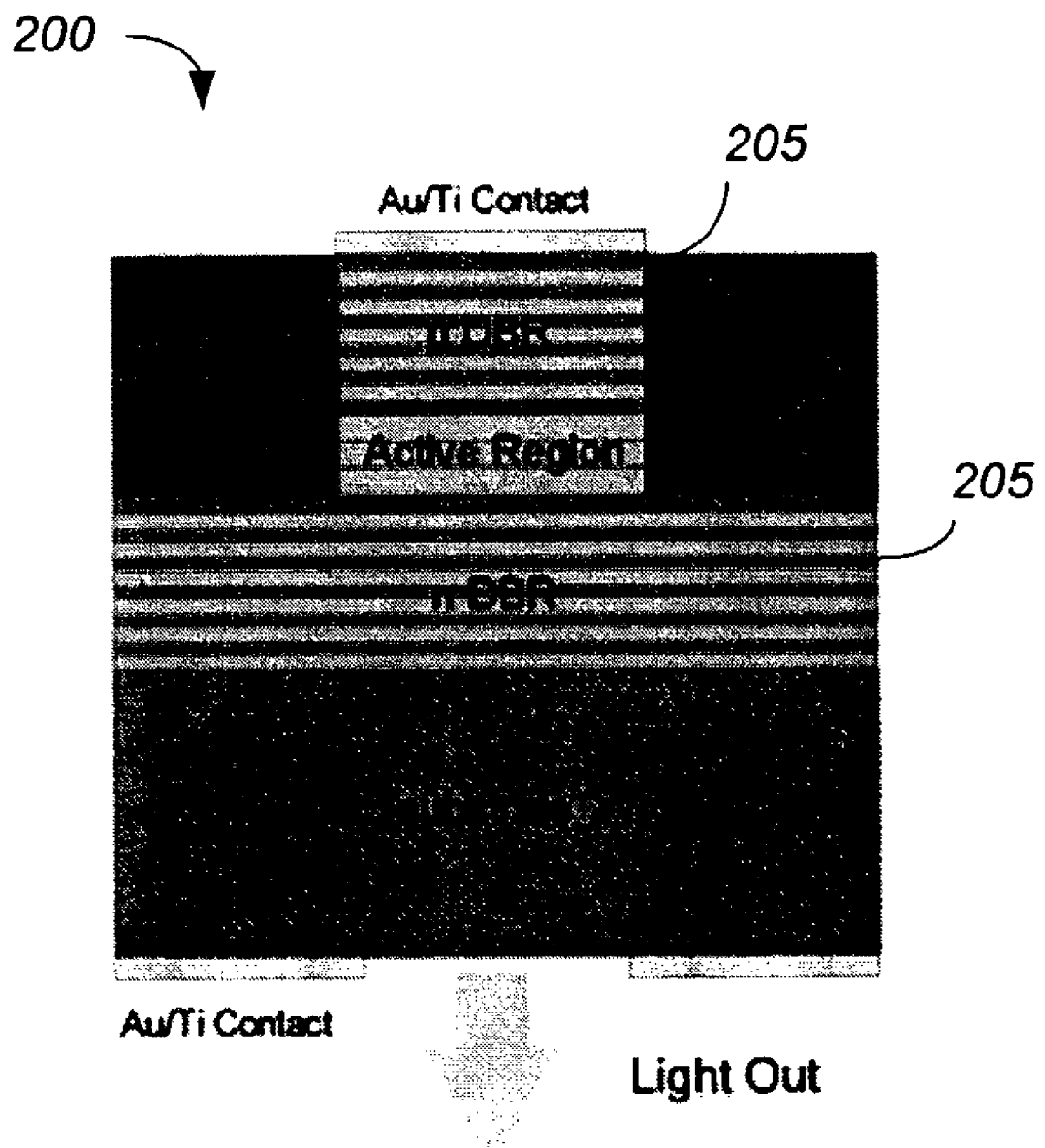
FIG. 2 is a sectional view of a vertical cavity surface emitting laser (VCSEL).

The CW lasers 115 may be, for example, edge-emitting lasers or vertical cavity surface emitting lasers (VCSELs), or other semiconductor lasers. VCSELs may be desirable for their uniform, single mode beam profiles, which may be more easily coupled to optical fibers 110, 120. The cavity length of VCSELs may be very short, e.g., one to three wavelengths of the emitted light. As a result, a photon may have a small chance of a triggering a stimulated emission event in a single pass of the cavity at low carrier densities. Consequently, VCSELs may require highly reflective mirrors to be efficient. Whereas, the reflectivity of the facets in edge-emitting lasers may be about 30%, the reflectivity required in VCSELs for low threshold currents may be greater than 99%. Achieving such a high reflectivity with metallic mirrors may be impractical. Instead, many VCSELs use Distributed Bragg Reflectors (DBRs). FIG. 2 shows an exemplary VCSEL structure 200. DBRs 205 in the laser structure may be formed by laying down alternating layers of semiconductor or dielectric materials with different refractive indexes.

Figure 3:
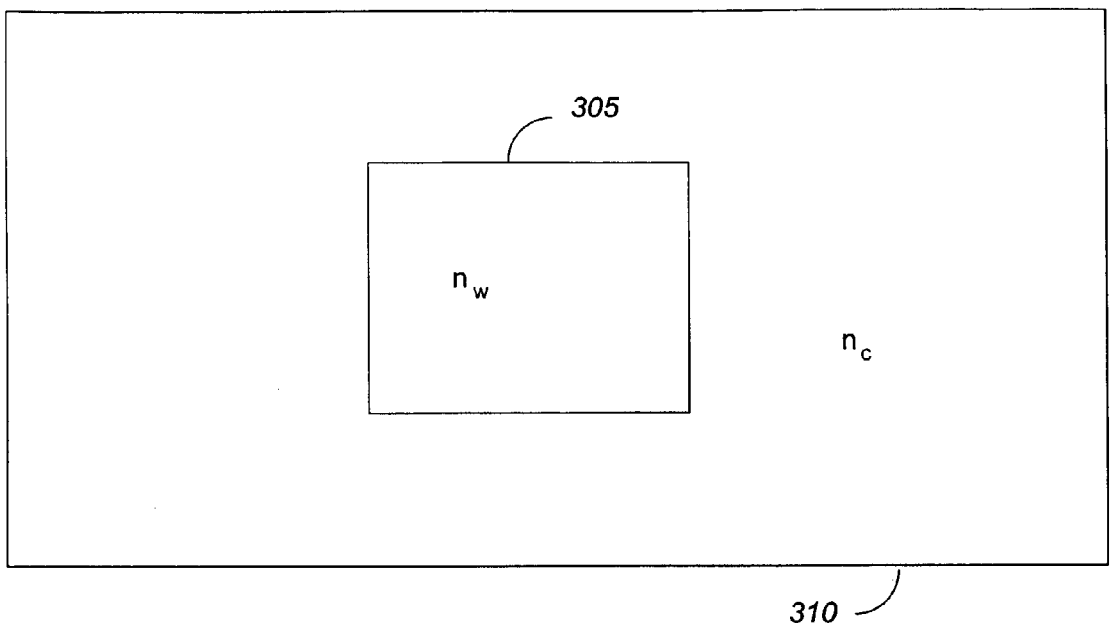
FIG. 3 is a sectional view of an integrated waveguide structure.
Figure 4:
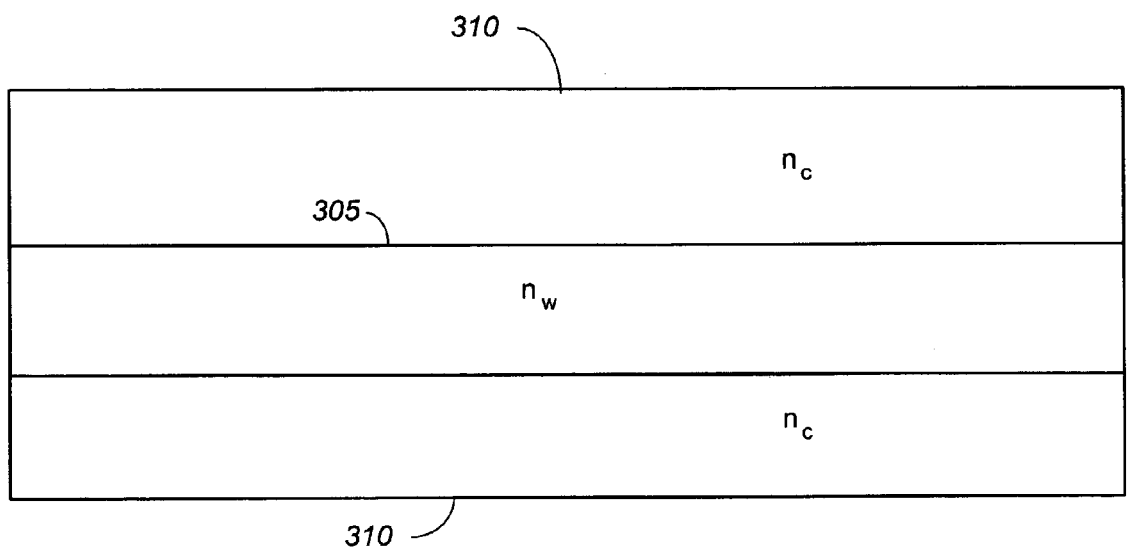
FIG. 4 is a plan view of an integrated waveguide structure.

As described above, the incoming waveguides 125 and outgoing waveguides 135 may be integrated in the chip. A cross section and a top view of an integrated waveguide are shown in FIGS. 3 and 4, respectively. The waveguide may include an optically guiding core 305 of a material with refractive index $n_w$ surrounded by a cladding material 310 with a different index of refraction, $n_c$. The high contrast of the refractive index between the two materials provides nearly complete internal reflection in the core, thereby confining a lightwave to the waveguide 305.

Silicon oxide ($SiO_2$) ($n_c \approx 1.5$) may be used as the cladding material 310. The waveguide material may be selected from, e.g., silicon nitride ($Si_3N_4$) ($n_w \approx 2$), silicon (Si) ($n_w \approx 3$), and silicon oxynitride (SiON) ($n_w \approx 1.55$). Silicon oxynitride may offer design flexibility because its refractive index can be varied by changing the content of nitrogen.

An integrated modulator may include a waveguide made from an electro-optic material (such as a chromophore doped polymer) and an electrode 510. A light beam in the waveguide may be modulated by electrical signals passing through the electrode 510.

Figure 5:
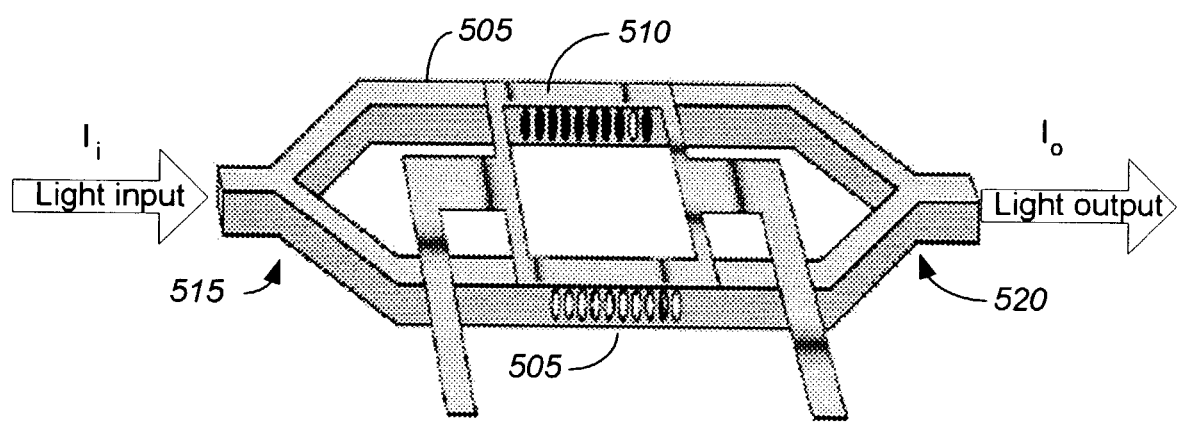
FIG. 5 is a perspective view of an integrated modulator.

The integrated modulator shown in FIG. 5 has a March-Zehnder (MZ) structure in a push-pull configuration. The input ($I_i$) and output ($I_o$) light for a MZ device are related by $I_o = I_i \sin[(\phi_{ba} + \Delta\phi)/2]$, where $\phi_{ba}$ is the phase divergence between the arms 505 without application of an electric field, and $\Delta\phi = \pi n^3 r_{33} VL/\lambda h$. The drive voltage, $V_\pi$, for a MZ modulator may be given by $V_\pi = \lambda h/n^3 r_{33} L$, where $r_{33}$ (electro-optic coefficient or the waveguide material) is the component of the electro-optic tensor that lies in the applied electric field direction. The MZ modulator acts to transduce an electric signal onto an optical transmission as an amplitude modulation. If no electric field is applied, the signals that were split apart by a first Y-junction 515 recombine to give the original signal at a second Y-junction 520. If an electric field of magnitude appropriate to produce a phase shift of $\pi$ is applied only to one arm of the MZ device, then the signals will cancel at the second Y-junction.

The integrated waveguides and integrated modulators may be created on the chip using standard complementary metal oxide semiconductor (CMOS) fabrication methods. The integrated waveguides may be fabricated on a silicon layer in the chip. For example, a lower cladding layer may be formed by thermal oxidation of the silicon layer. The core may be deposited by plasma enhanced chemical vapor deposition (PECVD). A waveguide pattern may be defined by optical contact lithography and transferred to the core layer by reactive ion etching (RIE). The etched waveguide pattern may be overgrown with PECVD silicon oxide as the upper cladding layer.

The optical components may be incorporated in optics layer(s), which may be separate from the layers containing the electronic circuitry components of the microprocessor. For example, the optical layer(s) may be formed on the top metallization layer of the chip during backend processing. In this case, a lower cladding layer for the integrated waveguides may be formed by growing a silicon oxide layer using chemical vapor deposition (CVD) or sputtering techniques.

Figure 6:
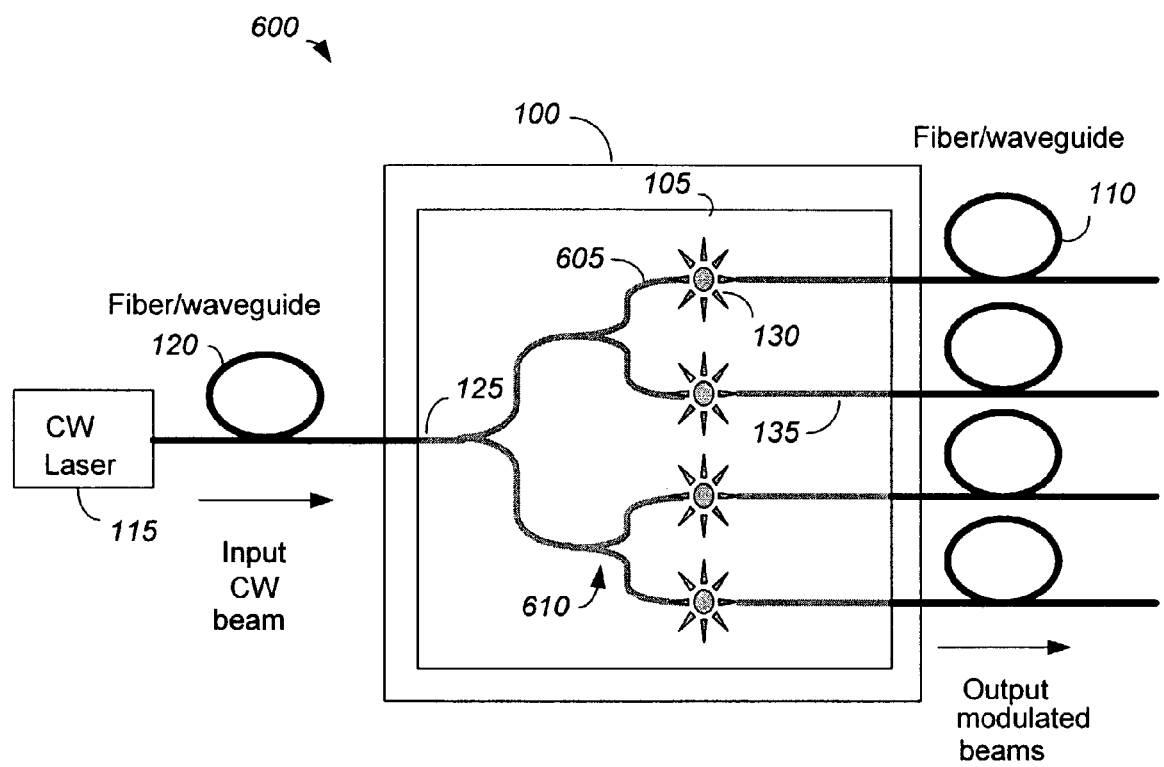
FIG. 6 is a block diagram of an alternative system including a microprocessor with multiple optical interconnects.

FIG. 6 shows an alternative optical interconnect system 600 which includes one CW laser 115 providing a single CW light beam to the microprocessor. The incoming integrated waveguide 125 may be split into several waveguides 605 by one or more splitters 610 to provide CW light beams to each of the multiple integrated modulators 130.

Figure 7:
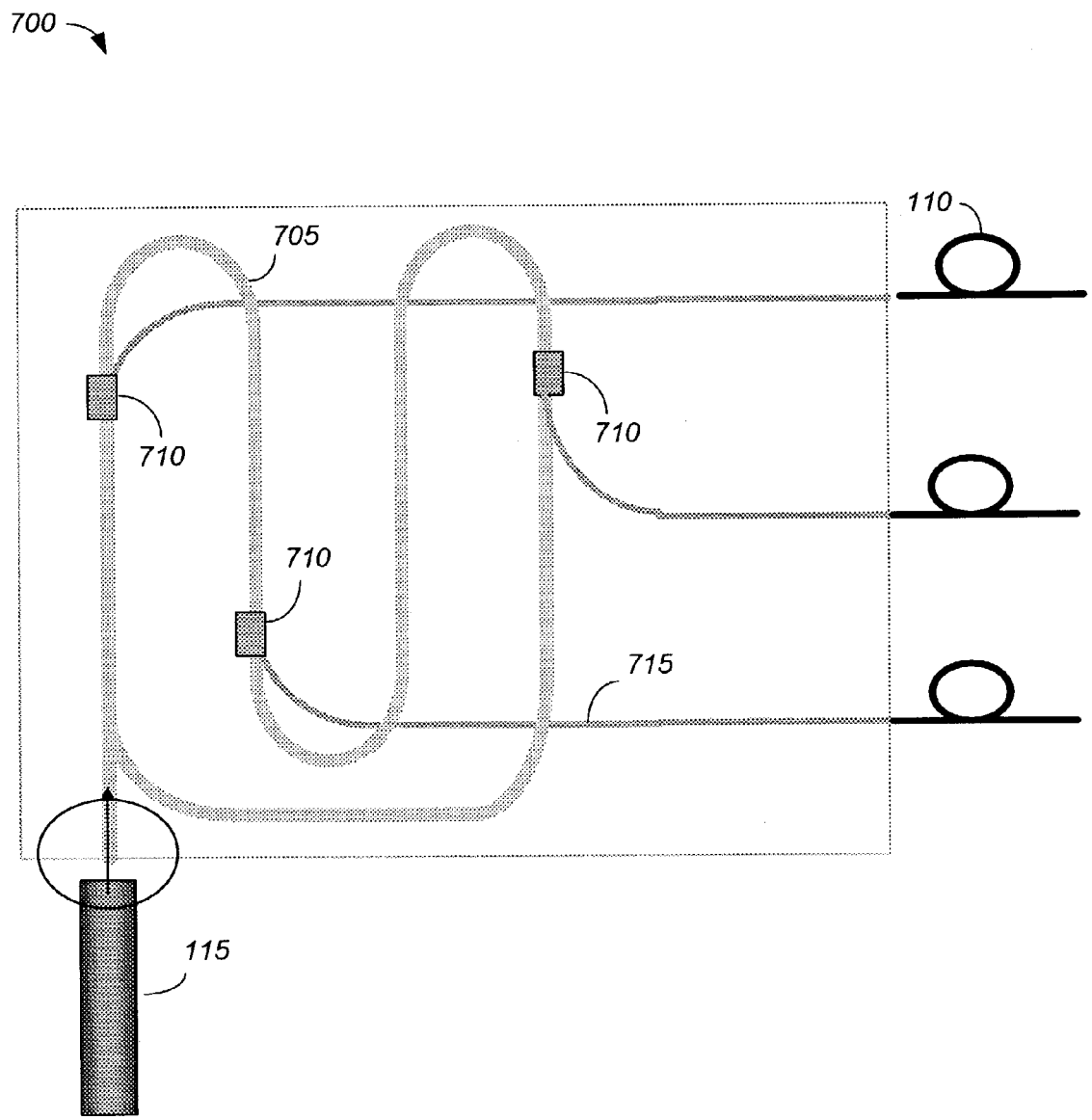
FIG. 7 is a block diagram of another alternative system including a microprocessor with multiple optical interconnects.

FIG. 7 shows an alternative optical interconnect system 700 which includes one incoming "light pipe" 705 which replaces the incoming integrated waveguide(s) 125. The light pipe may be a waveguide which forms a closed end loop. The modulated taps 710 may work at high frequency to both tap light from the light pipe 705 and into secondary waveguides 715 and encode data by modulating the tap.

Figure 8:
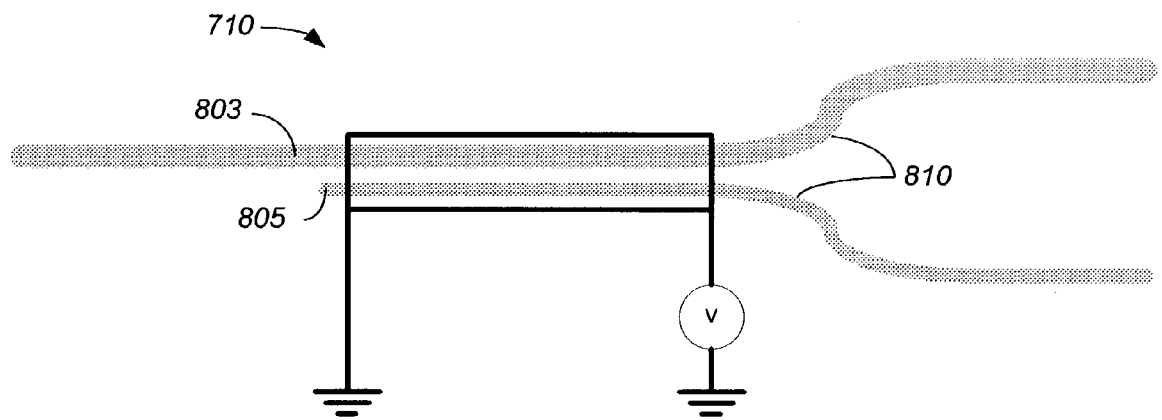
FIG. 8 is a schematic diagram of a modulated tap.

As shown in FIG. 8, a modulated tap 710 may include two side-by-side waveguides 803, 805 separated by a few micrometers. Voltage applied by an electrode may cause a change in the evanescent coupling efficiency between waveguide 803 and waveguide 805. In the off state the light goes through the device unaltered, i.e., no light is tapped from the light pipe 705. When a high frequency signal voltage is applied, the intensities at the output ports 810 are determined by either modulation of the phase mismatch, $\Delta\beta$, or the coupling coefficient $\kappa$. Thus, change of voltage by an amount $V_s$ switches an input signal from one output port to the other. The now modulated light is transferred to the secondary waveguide and is sent off-chip. Only a portion of the light in the light pipe 705 may be needed, e.g., about 5%. Since all of the light is not being switched to the secondary waveguide 715, a full $\pi$ phase shift may not be required. Consequently, the drive voltage requirement for a modulated tap may be less than that required for a MZ modulator.

Figure 9:
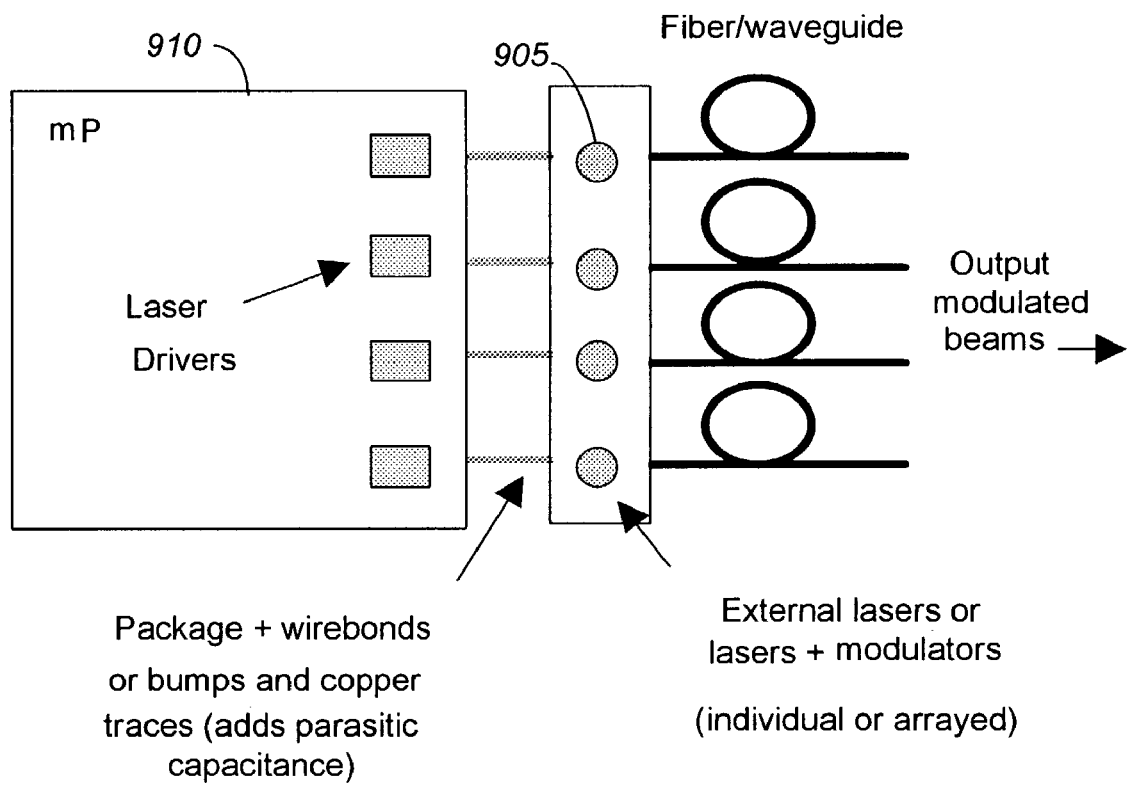
FIG. 9 is a block diagram of a system including a microprocessor utilizes external modulators and optical interconnects.

Some optical interconnect schemes drive external lasers directly or an external modulator. This requires hybrid assembly of the microprocessor and optical devices to create multichip modules. Typically the optical devices 905 are wire bonded or flip-chipped to the substrate 910 with the microprocessor, as shown in FIG. 9. The process may be manually intensive and costly.

The proposed architectures use integrated optical devices, which may increase interconnect bandwidth by eliminating the parasitic effects introduced by the package. The only high bandwidth signals leaving the chip 100 are optical, whereas the structure in FIG. 9 requires an electrical signal to drive the external laser or a transmission line. Furthermore, the integrated components circumvent hybrid packaging, thereby reducing costs through simplified packaging and economies of scale.

A number of embodiments have been described. Nevertheless, it will be understood that various modifications may be made without departing from the spirit and scope of the invention. Accordingly, other embodiments are within the scope of the following claims.

The invention claimed is:

1. An apparatus comprising:
    a microchip including
        an incoming waveguide adapted to be coupled to a light source,
        an outgoing waveguide adapted to be coupled to an external waveguide, and
        a modulator interconnected between the incoming waveguide and the outgoing waveguide, the modulator operative to modulate light from the light source into light signals;
    wherein the microchip includes a microprocessor that effects off-chip microprocessor signaling by driving the modulator.

2. The apparatus of claim 1, wherein the light source comprises a continuous wave laser.

3. The apparatus of claim 2, wherein the laser comprises a vertical cavity surface emitting laser.

4. The apparatus of claim 1, wherein the external waveguide comprises an optical fiber.

5. The apparatus of claim 1, wherein the incoming and outgoing waveguides and the modulator comprise CMOS (complementary metal-oxide semiconductor) compatible devices.

6. The apparatus of claim 1, wherein the microchip further comprises:
    a plurality of optical layers including the incoming and outgoing waveguides and the modulator; and
    a plurality of metallization layers including electrical signal lines.

7. The apparatus of claim 1, wherein the microprocessor includes a driver operative to provide electrical signals to the modulator to generate the light signals.

8. A method comprising:
    injecting a light beam into a first waveguide integrated in a microchip including a microprocessor;
    effecting off-chip signaling for the microprocessor by modulating at least a portion of the light beam in the microchip into light signals; and
    transmitting the light signals off of the microchip via an optical interconnect.

9. The method of claim 8, wherein said injecting a light beam comprises injecting a continuous wave laser beam.

10. The method of claim 8, wherein said modulating comprises providing electrical signals corresponding to the light signals to a modulator operative to alternately block and transmit the light beam in response to the electrical signals.

11. The method of claim 8, wherein said transmitting comprises transmitting the light signals along a second waveguide in the microchip to an external waveguide coupled to the second waveguide.

12. The method of claim 8, further comprising:
    splitting the light beam into a plurality waveguides integrated in the microchip; and
    separately modulating the light beam in the plurality of waveguides.

13. A system comprising:
    a light source;
    a microchip including
        an integrated waveguide coupled to the light source,
        an integrated modulator operative to modulate light in the integrated waveguide into light signals, wherein the microchip includes a microprocessor that effects off-chip microprocessor signaling by driving the integrated modulator,
        an external waveguide coupled to the integrated waveguide; and
    a device coupled to the external waveguide, the device including a converter operative to convert the light signals into corresponding electrical signals.

14. The system of claim 13, wherein the integrated waveguide and the integrated modulator comprise CMOS (complementary metal-oxide semiconductor) devices.

15. The system of claim 13, wherein the converter comprises a photodetector.

16. The system of claim 13, wherein the converter comprises a phototransistor.

17. The system of claim 13, wherein the light source is a continuous wave laser.

18. The system of claim 13, wherein the external waveguide comprises an optical fiber.

19. The system of claim 13, wherein the microchip comprises:
- a plurality of optical layers including the integrated waveguide and the integrated modulator; and
- a plurality of metallization layers including electrical signal lines.

20. The system of claim 13, wherein the microprocessor includes a driver operative to provide electrical signals to the modulator to generate the light signals.

* * * * *